Nov. 10, 1931.　　　B. JOHNSEN　　　1,830,760
CUT-OFF AND DELIVERY MECHANISM
Filed Jan. 5, 1927　　12 Sheets-Sheet 1
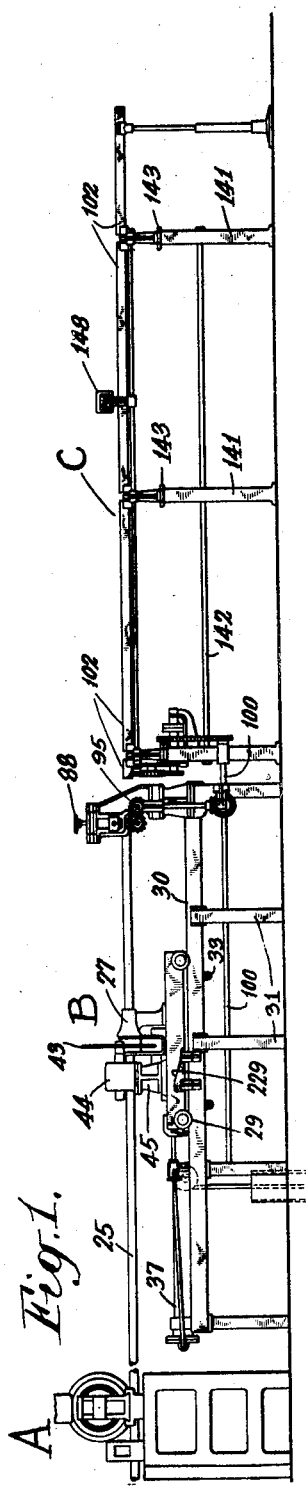
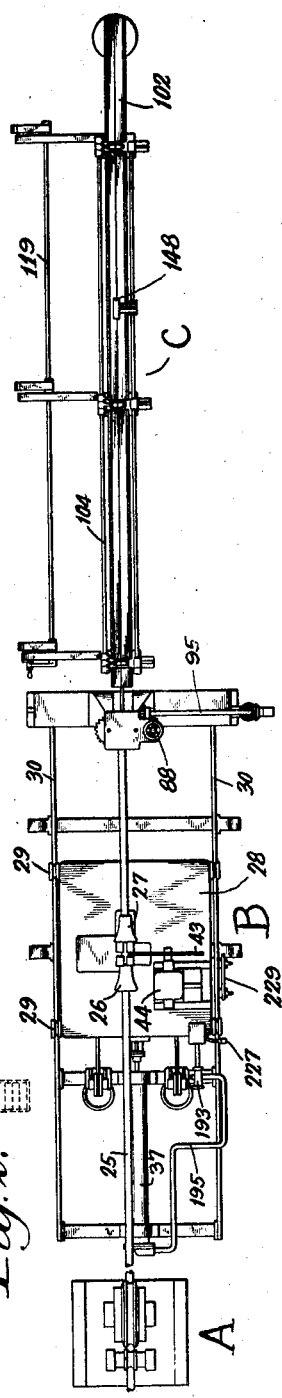
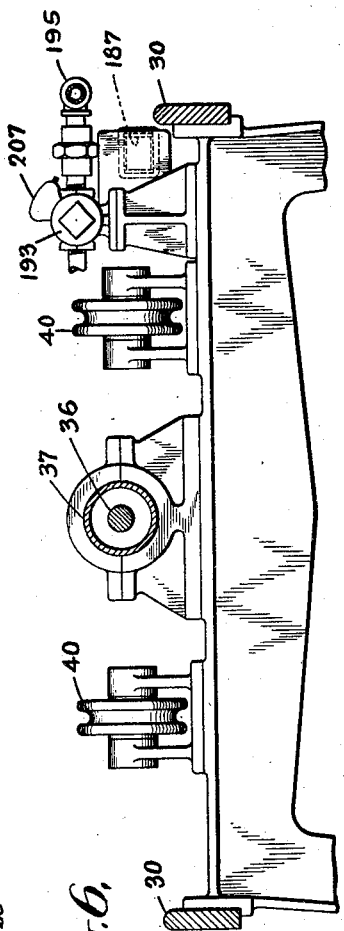
Inventor
Bjornulf Johnsen by
Cooper, Kerr & Dunham
His Attorneys Nov. 10, 1931.  B. JOHNSEN  1,830,760
CUT-OFF AND DELIVERY MECHANISM
Filed Jan. 5, 1927   12 Sheets-Sheet 2
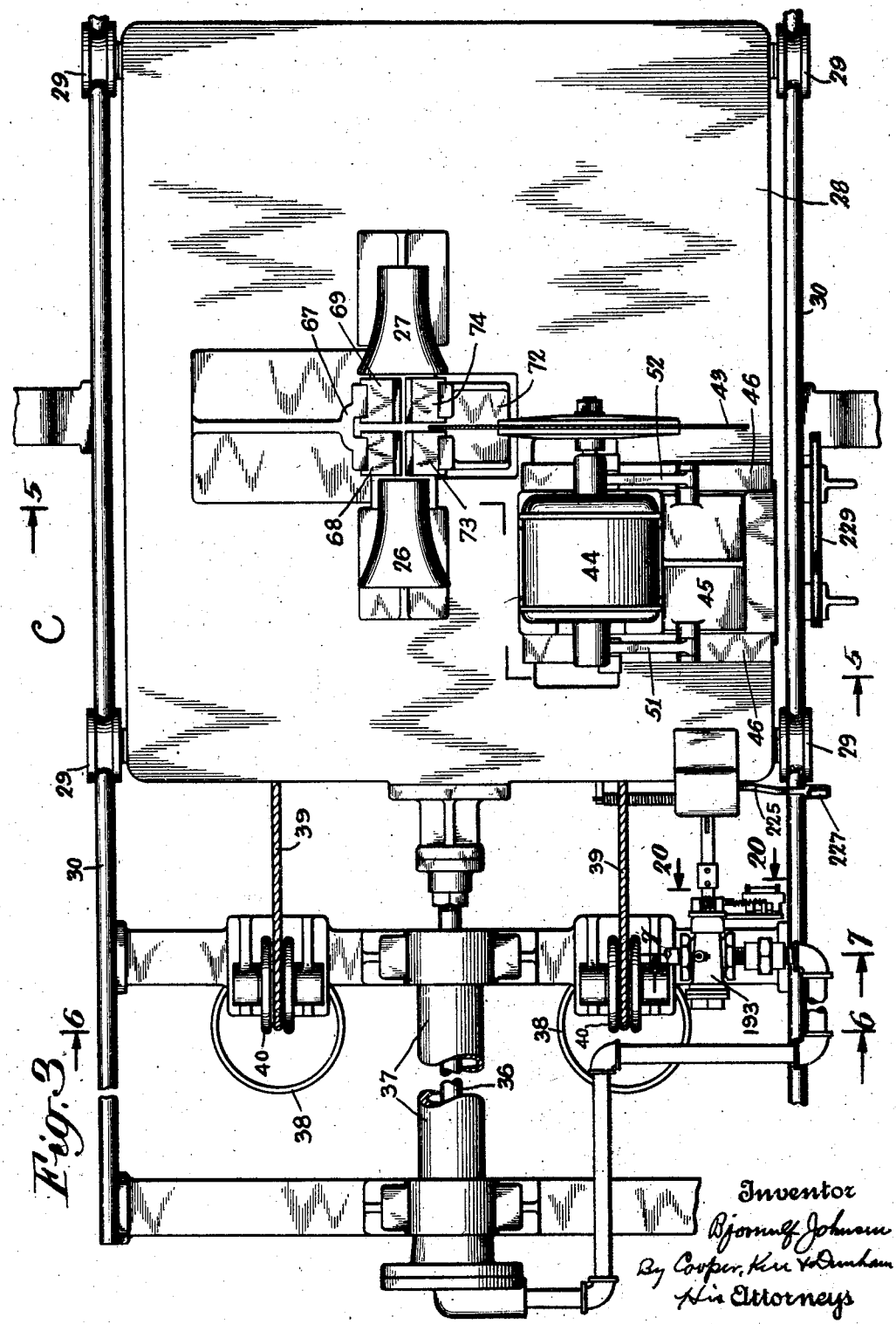

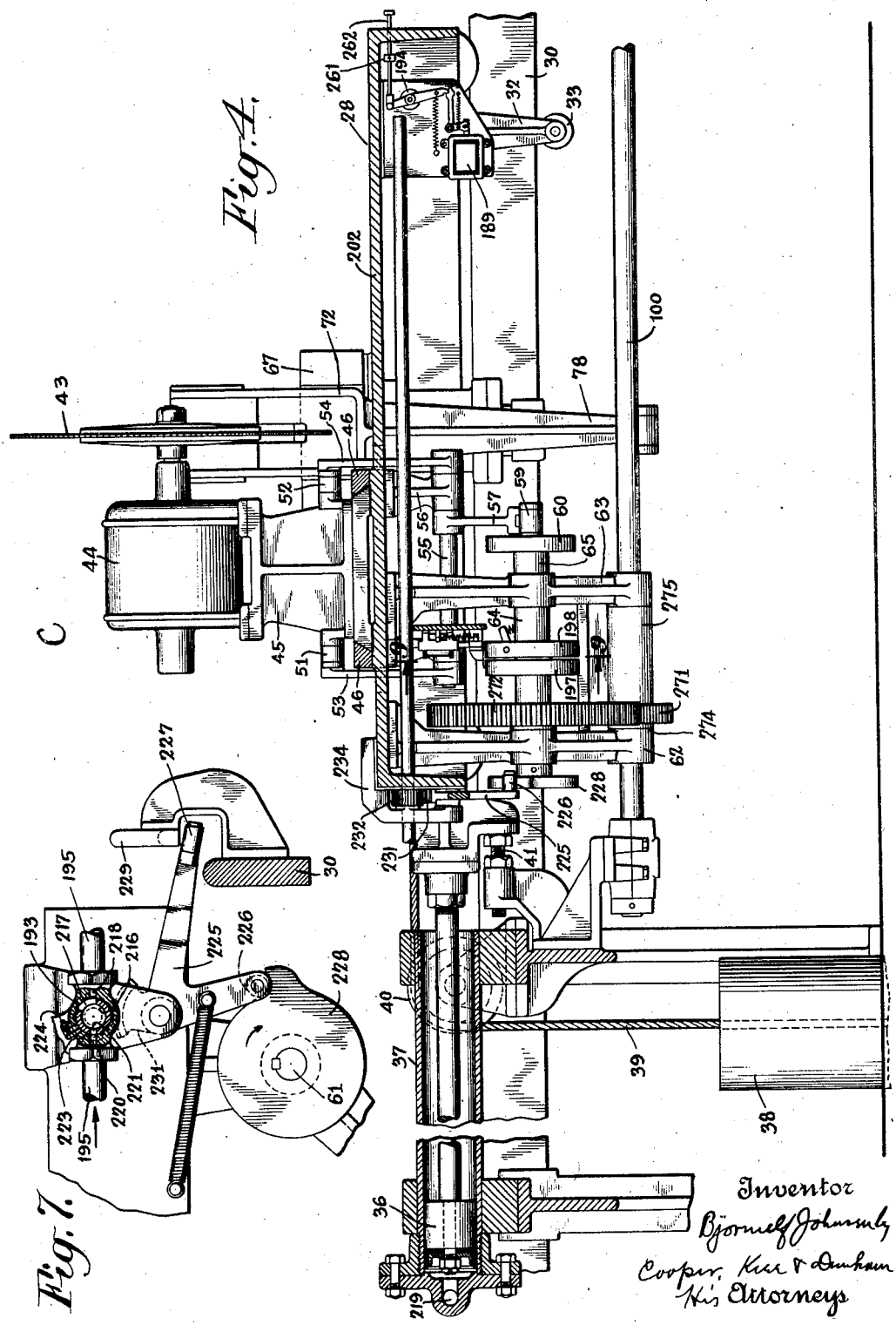

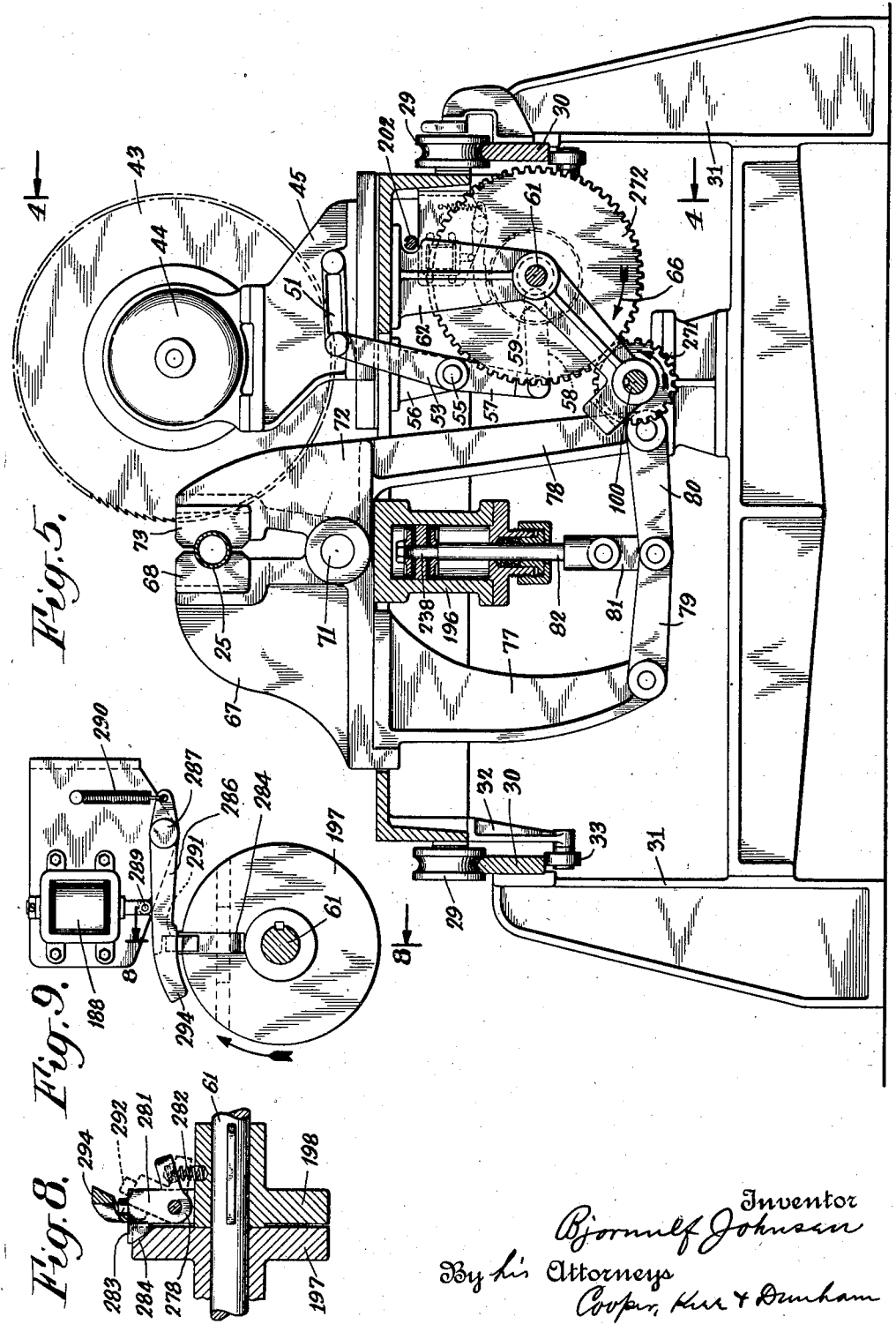

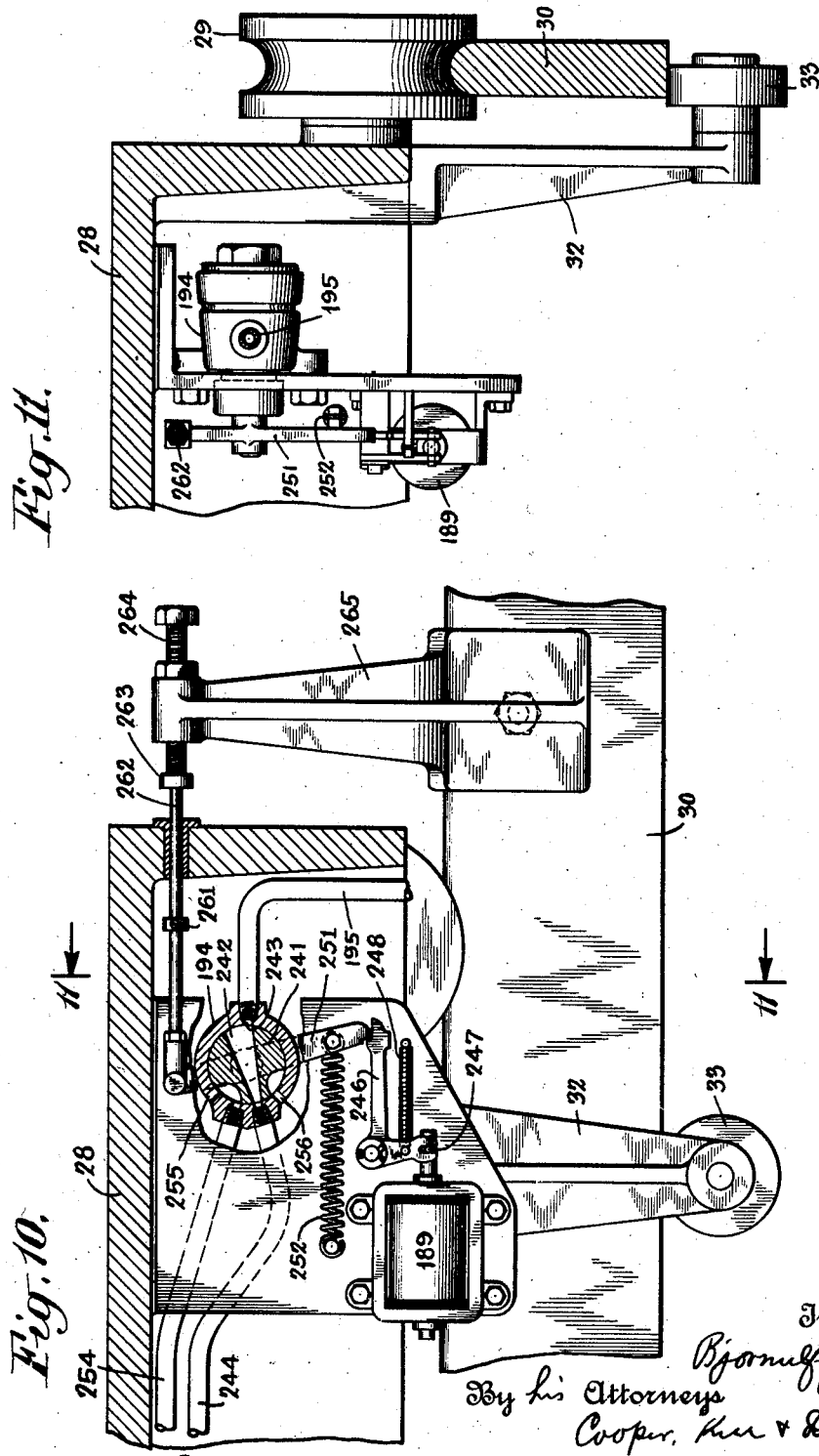

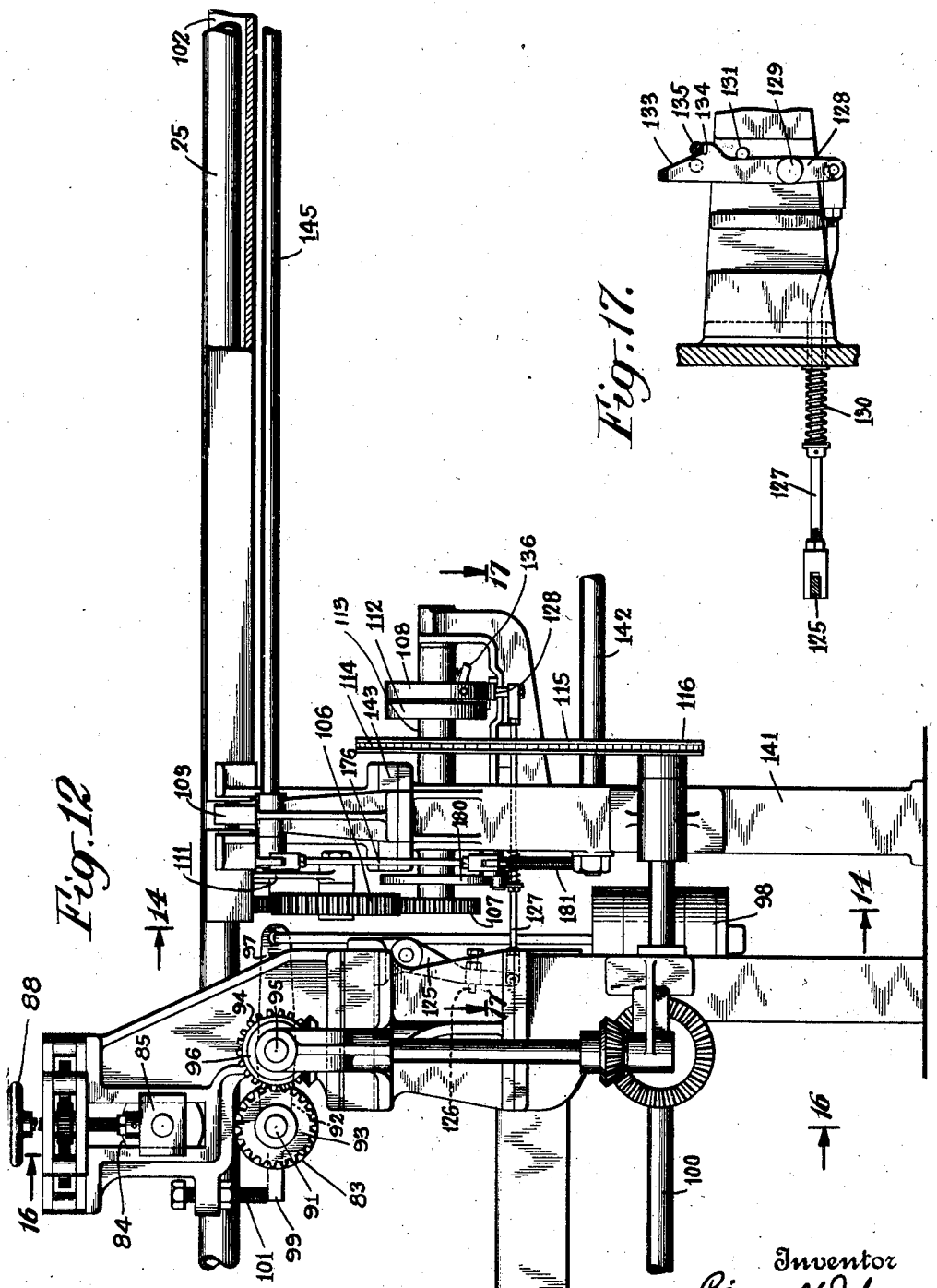

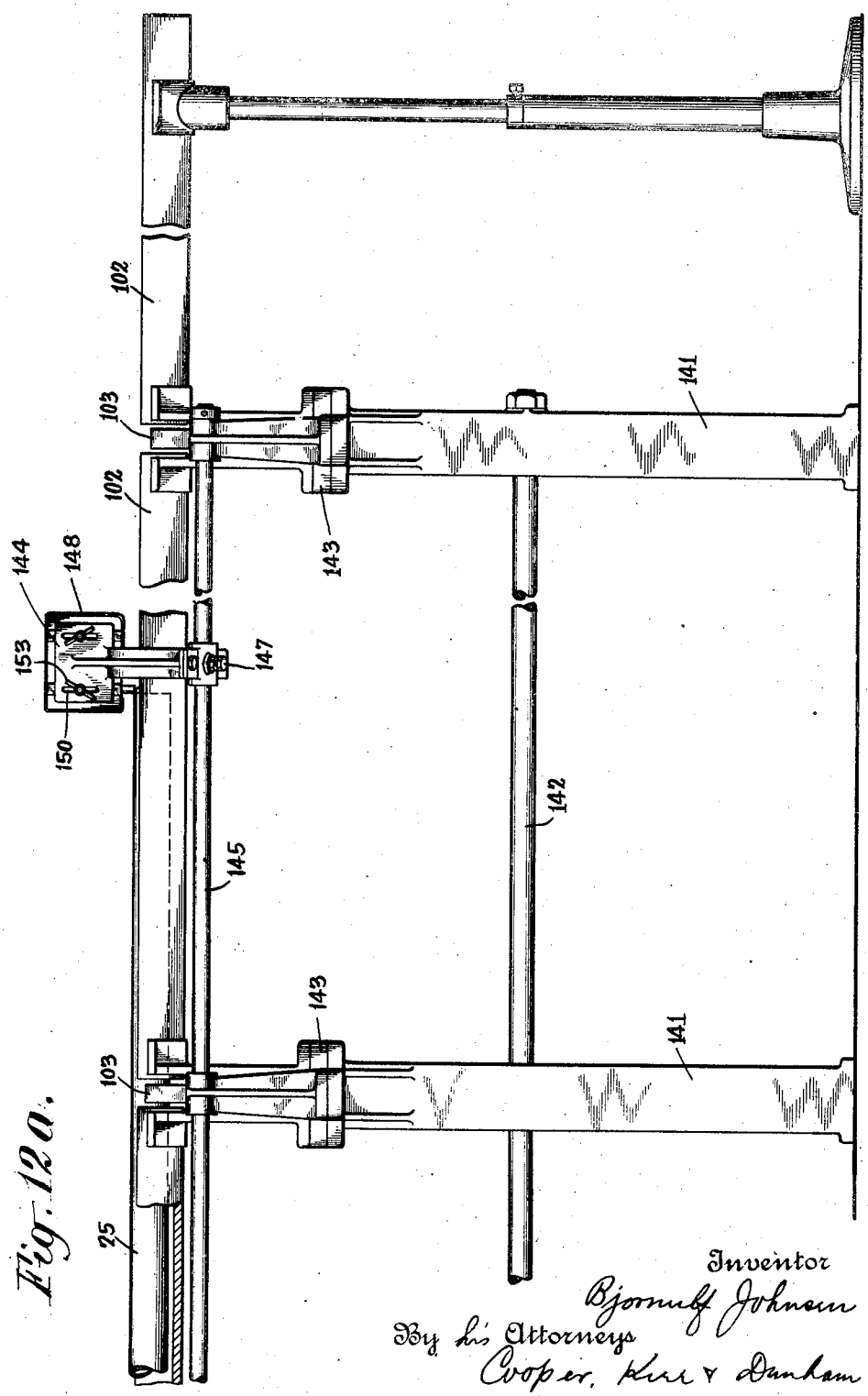

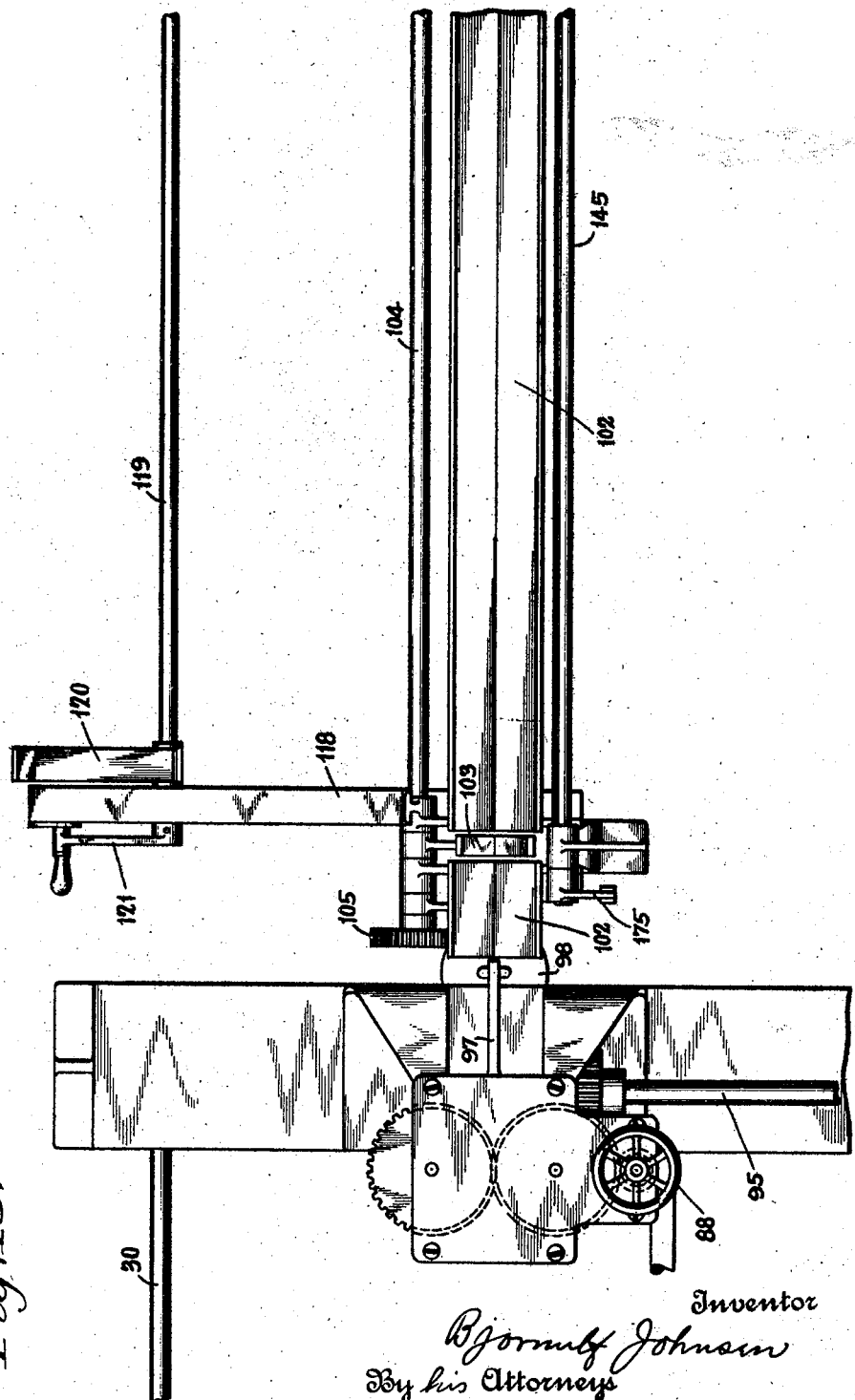

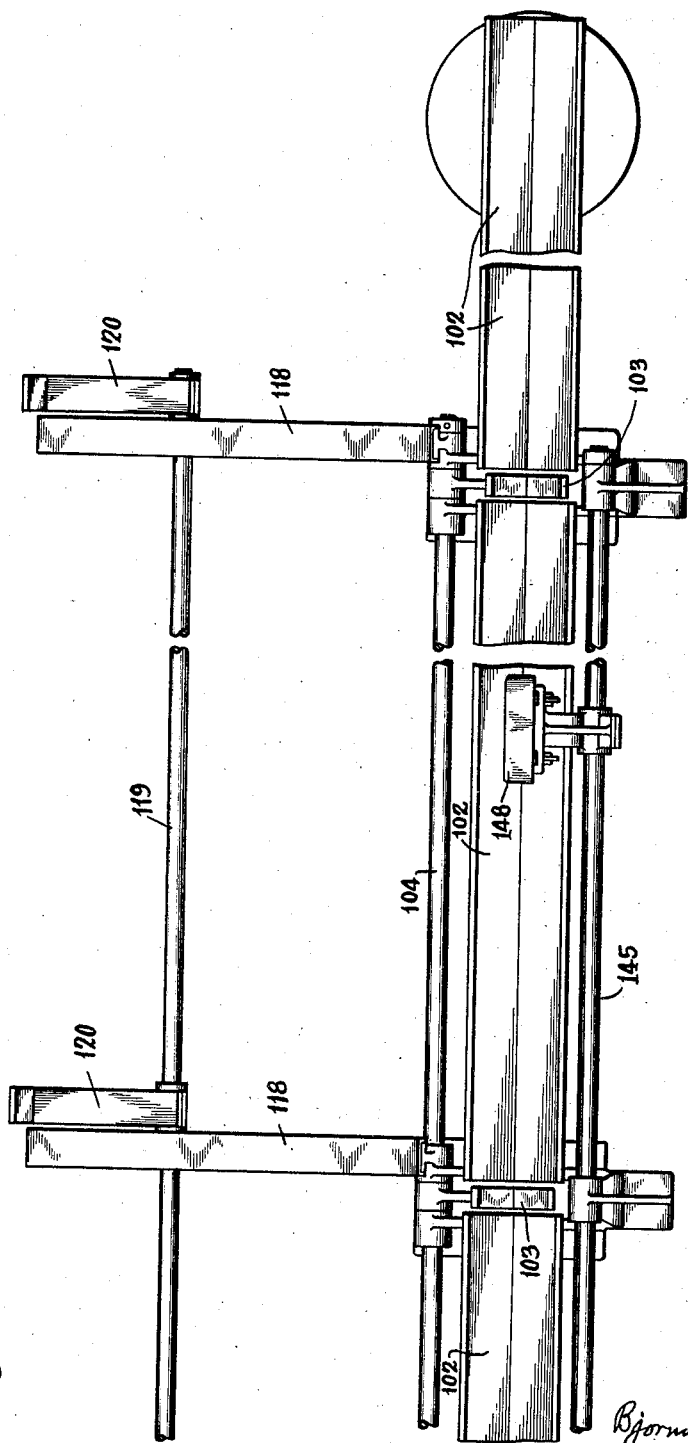

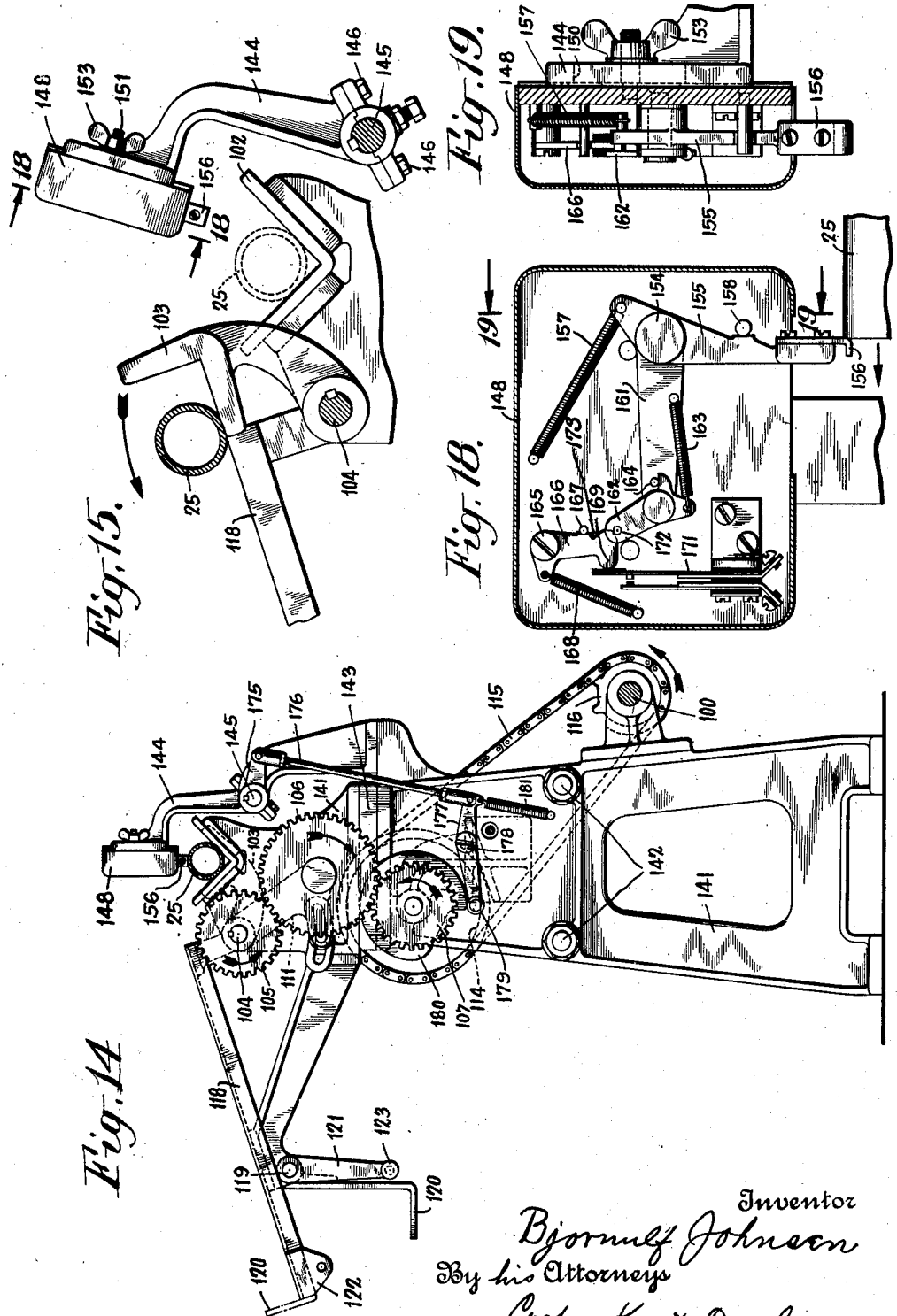

Nov. 10, 1931.  B. JOHNSEN  1,830,760
CUT-OFF AND DELIVERY MECHANISM
Filed Jan. 5, 1927   12 Sheets-Sheet 11

Inventor
Bjornulf Johnsen
By his Attorneys
Cooper, Kerr & Dunham

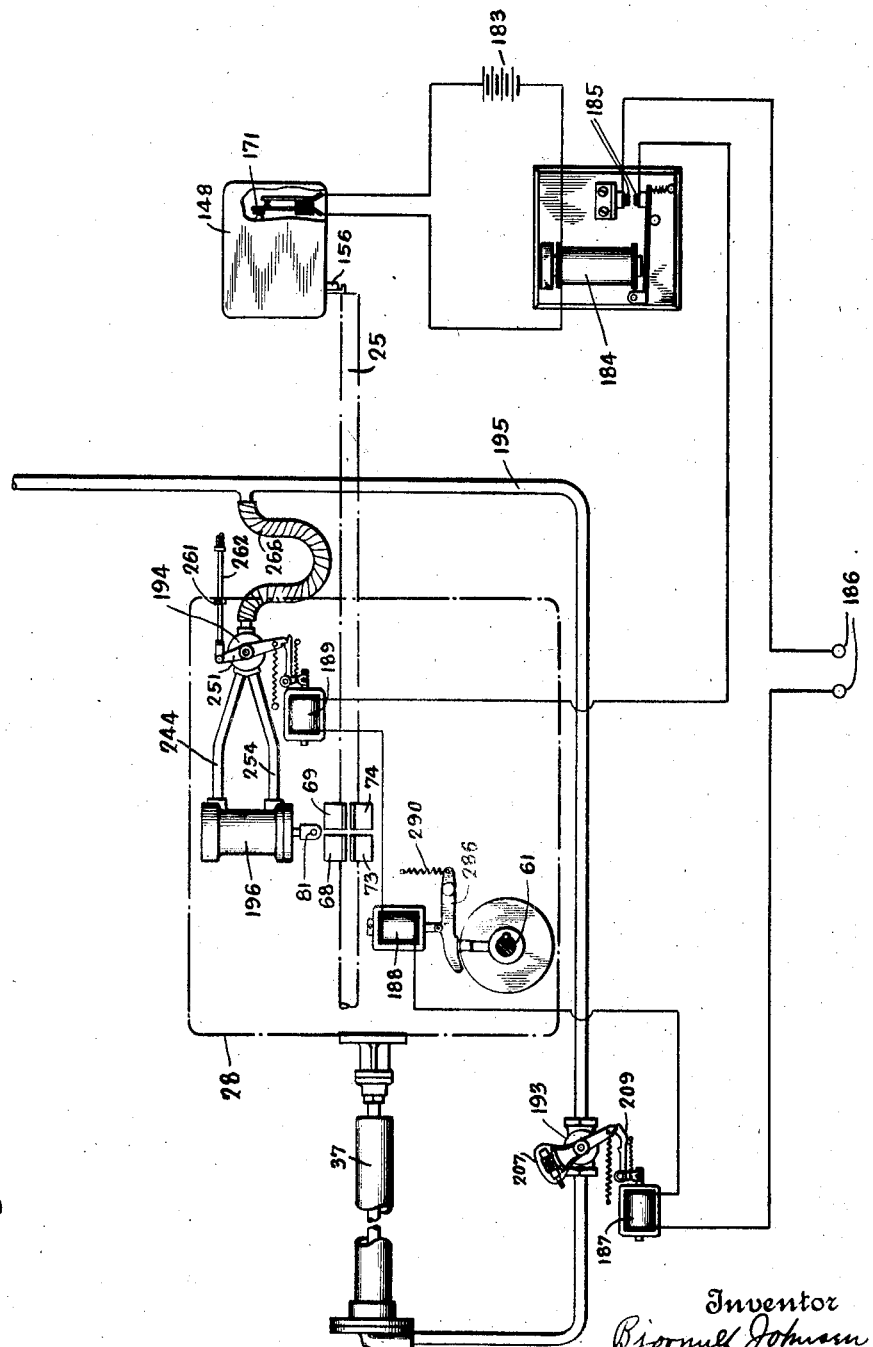

Patented Nov. 10, 1931

1,830,760

UNITED STATES PATENT OFFICE

BJORNULF JOHNSEN, OF NEW YORK, N. Y., ASSIGNOR, BY MESNE ASSIGNMENTS, TO STEEL AND TUBES, INC., A CORPORATION OF OHIO

CUT-OFF AND DELIVERY MECHANISM

Application filed January 5, 1927. Serial No. 159,036.

This invention relates to cut-off and delivery mechanisms and one of its objects is to provide a cut-off and delivery mechanism suitable for application to what are known as continuous tube welding machines. As will be apparent later on, however, the improved mechanism is of such a nature that it may be employed for cutting off rods or similar materials and is not necessarily limited to use with a tube machine.

Some of the tube welding machines now in use produce and feed finished welded tubing at the rate of sixty feet or more per minute. While the construction herein disclosed is capable of a wide range of uses, either with or without modification, it is peculiarly suitable for severing and making deliveries of sections cut off from a tube which is produced and fed at such a relatively high speed. Such high speed is, however, not a necessary requirement to make the improvement useful. The general organization and operation of the improved cut-off and delivery mechanisms are such as to permit timing their operations automatically to make cut-offs and deliveries of sections of desired length regardless of the speed at which the tube is fed. In other words, if the rate of feed of the tube should rise above or fall below a normal speed, the length of sections cut off and delivered will not vary from the standard set for a production run. The improvement is therefore capable of embodiment with slow as well as high speed welding machines. The attainment of this general adaptability and automatic variation in operation according to the rate of tube fed is one of the principal objects of the invention.

Another object of the invention is to provide a cut-off mechanism which will cut off from a continuously advanced tubing sections which are uniformly of the length which is desired, such mechanism including a control apparatus which in turn comprises devices which may be manually adjusted according to the length of the section wanted. This manually adjustable device also controls in a way hereinafter explained, the operation of a delivery mechanism, preferably a side delivery mechanism, for carrying the severed sections out of the way of the advancing tubing. After the manually adjustable device is adjusted to represent the length of section wanted, the mechanism will sever and make deliveries of sections of tubing which are uniformly of the desired length.

Still another object of the invention is to provide a severing mechanism which will make clean cuts through the moving tubing without tearing or damaging the metal at either side of the cut. This is due partly to the way the severing device, such as a saw, is applied to and advanced through the tubing and partly to the fact that a connection between the severing mechanism and the tubing is established and maintained while the severing is being effected, thereby preventing any movement of the tubing relative to such severing device while the cut-off is being effected.

Still another object of the invention is to provide a severing or cut-off mechanism and a delivery mechanism suitable for the intended purpose which will not retard or interfere with the normal feed of the tube by the welding machine.

With the foregoing and other objects in view, the invention consists in a novel combination and relation of mechanisms and parts of mechanisms, a preferred embodiment being hereinafter described with reference to the drawings which accompany and form part of this specification.

In said drawings:

Fig. 1 is a side view showing in somewhat diagrammatic form the relations of the welding machine, the severing mechanism and the delivery mechanism.

Fig. 2 is a top plan view corresponding to Fig. 1.

Fig. 3 is a top plan view of the severing mechanism and some of the operating connections for it.

Fig. 4 is a section on the line 4—4 of Fig. 5 and shows in right side elevation the severing mechanism and various operating devices associated with it.

Fig. 5 is a section through the severing mechanism on the line 5—5 of Fig. 3.

Figs. 6 and 7 are, respectively, sections through the severing mechanism on the lines 6—6 and 7—7 of Fig. 3.

Figs. 8 and 9 show details of a one revolution clutch controlling the application of the severing device to the tubing, Fig. 8 being a section on the line 8—8 of Fig. 9.

Fig. 10 is a detail partly in section of valve mechanism for operating the clamps used to connect the severing mechanism to the tube while the severing is being effected.

Fig. 11 is a section on the line 11—11 of Fig. 10.

Figs. 12 and 12A are complementary parts of a side view of the delivery mechanism and show, among other things, details of the mechanism for speeding severed sections of tubing ahead of the on-coming tubing, and some details of the side delivery mechanism and control apparatus.

Figs. 13 and 13A are complementary top plan views of the devices shown in Figs. 12 and 12A.

Fig. 14 is a section on the line 14—14, Fig. 12.

Fig. 15 shows details of the side delivery mechanism and the manually adjustable part of the control apparatus for regulating the length of the sections to be cut and delivered.

Figure 16:
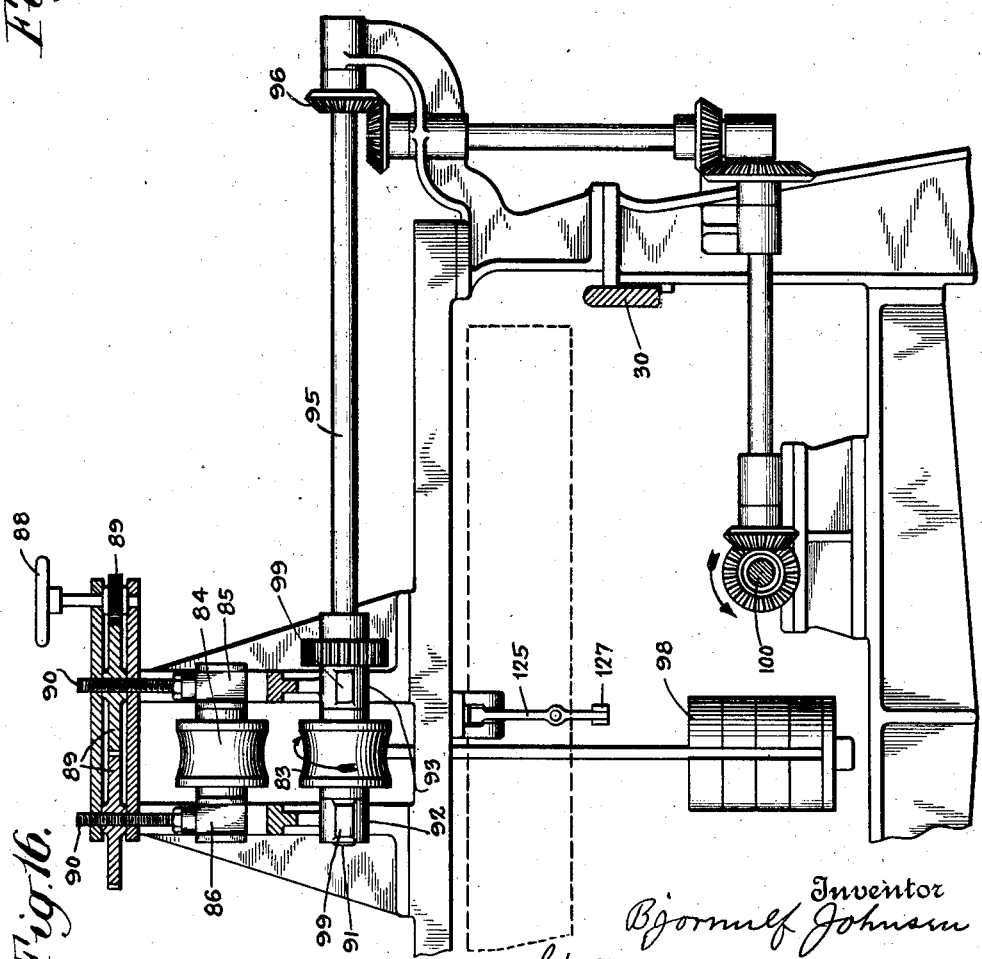

Fig. 16 is a section on the line 16—16 (Fig. 12) and shows details of the mechanism used for projecting severed sections of tubing ahead of the on-coming tubing.

Fig. 17 is a view along the plane 17—17 of Fig. 12.

Fig. 18 is a section along the lines 18—18 of Fig. 15, and Fig. 19 is a section on the line 19—19 of Fig. 18. These two figures show details of the contact devices controlling a relay which in turn controls the functioning of the various parts of the mechanism.

Figure 20:
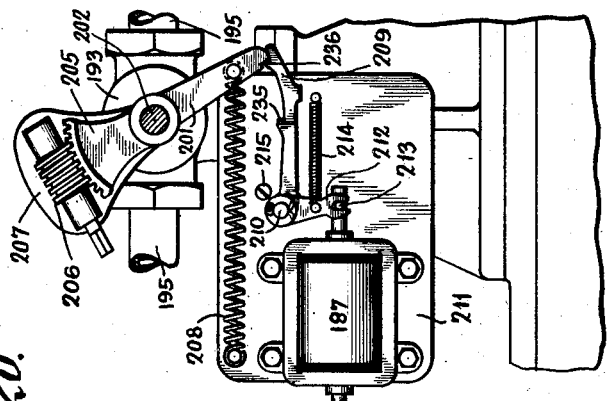

Fig. 20 shows details of the valve mechanism for controlling operations of the main carriage for the severing device.

Fig. 21 is a diagram illustrating the various electrical and air line connections employed in operating the severing and delivery mechanisms.

Stated in general terms, the embodiment of the invention shown in the drawings is designed to cooperate with a continuous tube welding machine of the kind which draws the material from a reel of flat stock and forms and welds the tube as the stock is progressed through the machine. Such welding machines sometimes have devices of various kinds for sizing the welded tubes and removing burrs left by the welding operation. In the drawings, all the mechanism for welding and completing the finished tubing is represented conventionally as at A, as the tube-making part of the apparatus forms no part of the present invention and an illustration and description of the details of construction of the tube-making mechanism is thought to be unnecessary. It is sufficient for present purposes to say that the mechanism represented by A forms and feeds continuously what is, in effect, an endless tubing, although in other uses of the invention some other making or continuous feeding mechanism may be employed.

The tubing coming from the welding machine is cut up into sections of the required length by the improved mechanism while the tube is moving and the severed sections are carried out of the path of the on-coming tube by devices comprising a side delivery mechanism. The side delivery mechanism delivers the severed sections to a temporary storage rack from which they may be dumped or removed whenever desired. The mechanism for severing the tubing represented generally in the drawings by B comprises a reciprocating carriage upon which the cutting device, in this instance a continuously driven saw, is mounted. The reciprocations of the carriage are controlled by the tubing through mechanism comprising an electrical contact or switch arm projecting into the path of the tubing. This contact or switch arm may be adjusted to different positions along said path according to the length of the sections desired.

In what may be termed the normal or idle position of the carriage, the tubing is fed past the cutting device until the desired length has been measured off, and the switch or contact arm operated by the end of the tubing. This initiates a movement of the carriage parallel to and in the same direction as the feed of the tubing at which time a clamp mechanism is operated to connect the carriage to the tubing. While the carriage is so connected, the saw is applied to cut off the measured length.

The mechanism brought into play when this first movement of the carriage is initiated includes an air-driven piston which drives the carriage in one direction while the carriage is connected to the tubing. Sufficient air pressure is used to tend to draw the tubing ahead, thereby placing the tubing under a tension while the cutting device is applied but the pressure is, of course, not great enough to interfere with the correct operation of the mechanism for forming and welding the tube.

After the carriage has reached the end of its movement with the tube, the clamps are released to disconnect the tube and carriage, and the carriage is then returned to its starting point.

The cutting device or saw is mounted upon a sliding support which is in turn supported by the reciprocating carriage above mentioned. As the reciprocating carriage moves with the tube the sliding support is actuated so as to move the saw into contact with and through the tube. The mechanism for actuating the saw support comprises a lever and crank connection so arranged as to advance the saw slowly as it comes into contact with the periphery of the tube, the rate of advance being increased until the saw has passed through, in this instance, the vertical diameter of the tube when the rate of advance is decreased as the saw finishes the cut-off. It is obvious that, owing to the clamp connection between the main carriage and this method of applying the saw, there can be no movement of the tube relative to the saw and that the variation of the rate of progress through the tube according to the amount of material which is at the time being cut prevents ragged cutting of the tubing and burning of the metal, this desirable result being furthered by the independent actuation of the main carriage to prevent the drag of the carriage from interfering with the feeding and cutting of the tube.

After a section has been cut off from the end of the advancing tubing, it is sped or projected ahead out of the way of the tubing which is coming past the cutting device into a trough which forms a part of the side delivery mechanism represented generally by C in the drawings. This side delivery mechanism comprises a set of arms rotating at right angles to the normal path of the tubing, the arms being so constructed as to lift the severed section out of the trough and deposit it upon a run-way leading to a temporary storage rack. The trough referred to is cut away or made in sections to permit operations of the delivery arms. The side delivery mechanism is called into play after each severing operation by connections which are in the present embodiment actuated by the main reciprocatory carriage after the clamps are operated to disconnect the carriage and tubing, and before the return movement of that carriage begins. As the reciprocations of the carriage are controlled by the electrical contact or switch arm previously mentioned, the operations of the side delivery mechanism are, in fact, controlled by the same contact or switch arm. This construction is preferred but, as will be apparent later on, a separate connection from the switch arm may be employed to effect operations of the side delivery mechanism.

The foregoing general statement covers comprehensively most of the main features of the construction and operation of the invention. The embodiment shown in the drawings will next be described in detail.

Referring to Figs. 1 and 2, the mechanism shown at A is, as before stated, a conventional showing of a tube welding machine for producing and feeding out continuously a completed tube. From the welding machine A the tube 25 passes through a pair of guides, 26, 27, having the ends which are first engaged by the tube enlarged so as to direct the movement of the tube and insure correct alignment with the mechanism. The guides 26 and 27 are attached to the bed 28 of what has hereinbefore been referred to as the main reciprocating carriage. The carriage in question, in addition to the bed plate, comprises grooved rollers 29 running along tracks 30 suitably supported by the standards 31 and arms 32, Fig. 4, dependent from the bed plate, provided with rollers 33 under the tracks 30 to prevent accidental displacement of the carriage from the tracks. For convenience, the carriage will from now on be referred to as the carriage 28.

Connected to the carriage 28 is a piston 36, Figs. 3 and 4, movable to and fro in a cylinder 37. This piston mechanism and the way in which it is operated will be described somewhat in detail later on, it being sufficient at this point to say that the piston is driven by air pressure to the right in Figs. 1, 2, 3, and 4 in a direction parallel to the movement of the tube 25, after which the pressure is released and the piston and connected carriage returned to the position shown in the figures last mentioned by weights 38 and cable connections 39. The cables run over pulleys 40 supported by the frame of the cut-off mechanism. Adjustable stops 41 (Fig. 4) limit the return movement of the carriage.

The severing of the tube is effected by a rotary saw 43 which, while the mechanism is in operation, is continuously driven by a motor 44 mounted upon a support 45 which has its base suitably shaped to cooperate with a pair of guides 46 mounted on the carriage 28 and so arranged as to limit the movement of the support 45 and parts supported thereby to a to and fro movement at right angles to the line of travel of the main carriage 28. After the main carriage 28 starts its movement, the saw and motor support 45 are moved to carry the saw 43 through the tubing and then withdraw the saw from the path of the tubing before the return movement of the carriage begins.

The mechanism for operating the sliding saw and motor support 45 comprises a pair of links 51 and 52, Figs. 4 and 5, connected to the upper ends of arms 53 and 54 secured to a rock shaft 55 which is supported in brackets 56 on the under side of the carriage 28. Secured to the rock shaft 55 is an arm 57 connected at its lower end to a link 58 which is in turn connected to a pin 59 supported eccentrically by a disc 60 secured to a shaft 61 which is given a complete rotation at each severing operation. The shaft 61 is supported in brackets or arms 62 and 63 dependent from the main carriage 28. Spacing collars 64 and 65 (Fig. 4) are employed to maintain parts on the shaft in correct relative positions. As so far described, it is apparent that at each rotation of the shaft 61 in the direction of the arrow 66, Fig. 5, the sliding support 45 will be moved to the left as shown in said figure to carry the saw 43 through the tube 25 and then return the support and saw to the positions in which they are shown.

The crank and lever connection, just described, between the support 45 and the shaft 61 results in a retarded advance as the saw engages the tube with a gradual acceleration of the advance until the saw passes the diameter of the tube, after which the rate of advance decreases. The saw is then moved back out of the path of the tube. The mechanism for effecting rotations of the shaft 61 will be fully explained later.

Mounted upon the carriage 28 is a mechanism which is operated to grasp the tube 25 when the air driven movement of the carriage operating piston begins in order to connect the carriage and tube while the carriage is moving in the direction of the tube feed. This connection is maintained while the saw is carried to and fro for its severing and return movements after which the connection is released to permit the carriage to be returned to its original position without interfering with the continued forward feed of the tube by the welding machine.

In the present embodiment these connecting and disconnecting devices are in the form of a clamping mechanism which comprises a stationary member 67 carrying contact or gripping blocks 68 and 69 shaped to conform to the periphery of the tube. Pivoted at 71 (Fig. 5) is a movable element 72 provided with contact or gripping blocks 73 and 74 (see also Figs. 3 and 4) corresponding in shape to the blocks 68 and 69. It might be said at this point that the separate blocks 68, 69, 73 and 74 are employed so as to permit replacing them with blocks constructed to cooperate with tubes of different diameters and that the blocks in each pair are spaced apart to provide a clearance for the saw 43.

Integral with the members 67 and 72 of the clamp mechanism are arms 77 and 78 connected at their lower ends by toggle links 79 and 80, the adjoining ends of the links being pivoted to a link 81 which is in turn pivoted to the lower end of a piston rod 82. This rod is given a reciprocating movement in a way hereinafter described to operate the toggles 79 and 80 to close and release the clamps. In the positions of the parts shown in Fig. 5 the clamps are closed to grip the tube 25, but when the rod 82 is driven downward the movable part 72 of the clamp mechanism will be swung away to carry the contact blocks 73 and 74 out of engagement with the tube.

After the saw has severed the tubing and the clamps have been released, the section of tubing which has been severed by operation of the saw 43 is sped ahead of the on-coming tubing by a mechanism comprising a pair of rolls 83, 84, Fig. 16, having their peripheries shaped to conform in a general way to the circumference of the tube. The roll 84 is supported by blocks 85 and 86 which may be raised and lowered by means of a mechanism comprising a hand wheel 88 operating through pinions 89 and screws 90 to raise or lower the roll 84. The roll 83 is secured to a short shaft 91, Fig. 12, journaled in arms 92 and rigid with pinion 93 meshing with a pinion 94 secured to a shaft 95. Attached to the other end of the shaft 95 is a bevel gear 96 driven through beveled gears and shafts as shown in Fig. 16 from a shaft 100. The shaft 100 is the main power shaft of the mechanism and is continuously driven in the direction of the arrow shown in the figure last mentioned. The arms 92 supporting the shaft 91 are the side arms of a yoke which also includes an arm 97 supporting weights 98 which serve to hold the roll 83 in feeding position. Extensions 99 from the arms 92 cooperate with adjustable stops 101 to limit movement of the roll 83 toward the roll 84.

The mechanism whereby the power shaft 100 drives the roll 83 is so constructed as to rotate the roll 83 at a peripheral speed in excess of the speed at which the tube is advanced by the welding mechanism so that when the tube is severed by the saw 43 and released by the clamps, the severed section will be projected ahead of the on-coming tubing into a trough-like receiver made up of sections 102 (Figs. 12, 12A, 13, 13A, 14 and 15). These sections are disposed in alignment end to end and form a part of the side delivery mechanism.

The purpose of the sectional construction of the trough of the side delivery mechanism is to provide clearances for arms 103 secured to a shaft 104 which is given a complete rotation between each severing operation of the saw mechanism. The devices for effecting the rotations of the shaft 104 are best shown in Figs. 12, 13 and 14 and comprise a gear 105 attached to the shaft and meshing with an intermediate gear 106 which in turn meshes with a gear 107 rigid with one member 108 of a one-revolution clutch. The gear 106 is mounted upon an adjustable arm 111, Fig. 14, in order to permit substituting gears of different sizes when it is desired to change the speed of the shaft 104 with reference to the speed of the rest of the mechanism. Adjacent the member 108 (Fig. 12) of the one-revolution clutch is the cooperating clutch element 112 connected by a sleeve 113 to a sprocket wheel 114 driven by belt or chain 115 and a sprocket wheel 116 attached to the main power shaft 100. The member 112 of the clutch is, of course, running continuously while the power shaft 100 is driven.

After a section of the tube has been delivered to the receptacle or trough 102, the two members 112 and 108 of the clutch are connected long enough to transmit a rotation of the element 112 to element 108 and thereby effect a rotation of the delivery arms 103. As shown in Fig. 15, the delivery arms 103 have jaws conforming generally to the shape of the trough 102 so that rotations of the arms will lift the severed sections of tubing out of the trough and deposit them upon a run-way formed of the inclined bars 118.

Pivoted in the lower ends of the bars 118 is a shaft 119 carrying arms 120 and a crank or handle 121. Attached to one of the bars 120 is a lug 122 provided with a hole or recess with which a pin 123 projecting from the handle may be engaged to hold the arms 120 up into the position shown in the dotted outline in Fig. 14 to intercept and hold the severed sections until they can be removed. Disengaging the pin 123 and swinging the handle 121 downward will release the sections and allow them to run on a truck or other receiver.

The operations of the one-revolution clutch for actuating the side delivery mechanism just described are controlled by movements of the main reciprocating carriage 28. As the carriage reaches the end of its forward or air driven stroke, it operates or releases mechanism which establishes a connection between the clutch members 112 and 108 and then breaks the connection after the member 108 and the delivery mechanism connected thereto has gone through a single cycle of movement.

This mechanism comprises a pivoted arm 125, Fig. 12, carrying an adjustable abutment 126 which is engaged by the forward end of the carriage 28 at the end of the forward movement of the carriage. The pivoted arm 125 is connected at its lower end with a rod 127 (see also Fig. 17) which is connected at its other end to an arm 128, pivoted at 129 to the machine frame. A compression spring 130 tends at all times to hold the parts in the positions in which they are shown in the figure last mentioned, a fixed stop 131 limiting the movement of the parts by the spring in the one direction.

The pivoted arm 128 has an inclined face 133 and a shoulder 134 cooperating with a pin 135, forming part of a connecting pawl mechanism 136 (Fig. 12) which is spring actuated to connect the clutch members 108 and 112 when the shoulder 134 is rocked out of engagement with the pin 135 by engagement of the carriage 28 with the abutment 126 on the arm 125. As soon as the carriage moves out of contact with the abutment, the spring 130 restores the arm 128 to its original position, thereby bringing the inclined portion 133 of the arm into position to intercept the pin 135 and operate the connecting pawl 136 to disconnect the members 112 and 108 and bring the member 108 and the connected side delivery mechanism to a stop. The connecting pawl mechanism mentioned is not shown or described in full detail as it is the same in the particulars not so described as another one-revolution clutch mechanism which will be described in detail in connection with another section of the mechanism.

The sections of the trough 102 are supported on standards 141 (Figs. 12 and 12A and 14) some of which are connected by tie rods 142 to give greater rigidity. Between the standards 141 and the trough are filler blocks 143 (Fig. 14). The reason for using the blocks 143 is to permit changing blocks of different thicknesses to raise and lower the trough 102 to conform to a change in the set-up of the mechanism (including the adjustment of the rolls 83 and 84, Fig. 16) for the purpose of handling tubing of different diameters.

As before stated, the mechanism of this invention includes a manually adjustable device forming a part of a control apparatus for regulating operations of the severing and delivery mechanisms to cut off and deliver sections of tubing of the length desired. In the present embodiment this manually adjustable device comprises an arm 144 (Figs. 12a, 13a and 15) splined on a rock shaft 145 which is supported by several of the standards 141. For convenience of assembly, the part of the arm surrounding the shaft 145 is made in two pieces held together by screws 146. A set screw 147 through one of said pieces forms a convenient means of fastening the arm in position at any point lengthwise of the shaft 145.

Supported on the upper end of the arm 144 is a casing or box 148 carrying an electrical contact mechanism which cooperates with the tube 25 to control operations of the mechanism as a whole. The box 148 is fastened to the arm 144 by means of threaded screws 151 fastened to the box and extending through vertical slots 150 in the arm, wing nuts 153 on the screws 151 serving to hold the box in different vertical positions according to the diameter of the tubing being worked upon.

Pivoted at 154 (Fig. 18) in the box 148 is a contact arm 155 carrying a contact plate or trip 156 to be engaged by the tube 25. A spring 157 normally holds the arm 155 against a fixed pin 158. Rigid with the arm 155 is an arm 161 to which is pivoted a pawl 162. A spring 163 between the pawl and the arm normally holds the parts in the relations shown in which an extension on the pawl is in contact with a pin 164 on the arm 161. Pivoted at 165 to the box 148 is a pawl 166 normally held in contact with a fixed pin 167 by a spring 168. An extension 169 on the pawl 166 engages one member 171 of a pair of electrical contacts. When the end of the tubing 25 strikes the trip 156 the pawl 162 is swung upward (Fig. 18) thereby causing a pin 172 on said pawl to rock the pawl 166 clockwise and flex the contact member 171 to close an electric circuit. The shape of the portion of pawl 166 which is engaged by the pin 172 is such that as soon as the contact has been made the pin 172 will enter a clearance 173 in the pawl 166 and the pawl 166 will thereupon be returned to its original position by the spring 168 and the circuit opened. When the trip 156 is freed from the tube 25, the spring 157 will return all of the connected parts to the positions in which they are shown in Fig. 18. During this return movement the pawl 162 will rock against the tension of its spring 163 and thereby permit restoration of the parts to their normal positions without flexing the contact 171 again to close the circuit. This is important; as the contact 171 controls the operations of the main reciprocating carriage, the severing mechanism and the side delivery mechanism and if the contact member 171 should be flexed during the return movements of the pawl 162 an incorrect second operation of these various sections of the mechanisms would result.

The arm 144 and box 148 are normally held in such positions that the trip 156 is in the path of the tube coming from the welding and severing mechanisms. In order to prevent interference with operations of the side delivery arms 103 the box 148 and contact trip 156 are swung away from the trough 102 while the arms 103 perform their function, after which the box and trip are returned to their normal positions with the trip 156 again in the path of the oncoming tubing.

The mechanism for carrying the trip out of and into the path of the tubing comprises the rock shaft 145 (Figs. 12, 12A, 13, 13A, 14 and 15) and an arm 175 secured to the shaft. Povotally connected to the arm 175 is a rod 176 (Fig. 14) pivoted at its lower end to a lever 177. The lever 177 is pivoted at 178 to one of the standards 141 and carries an anti-friction roller 179 riding on the periphery of a cam 180 rigid with the member 108 (Fig. 12) of the one-revolution clutch for operating the side delivery mechanism. A spring 181 holds the roller in contact with the cam. The configuration of the cam is such that as soon as the members 108 and 112 of the clutch are connected by release of the pawl 136 and movement of the member 108 begins, the cam 180 will permit the spring 181 to rock the shaft 145 to carry the box 148 and trip 156 from the positions in which they are shown in Fig. 14 to the positions in which they are shown in Fig. 15 and hold them in the latter positions long enough to permit the delivery arms 103 to operate, after which the box and trip are restored by the cam in time for the trip to be engaged by the on-coming tubing.

The circuit which is closed by flexing the contact strip 171 as previously described is a local circuit comprising a battery 183 (Fig. 21) and a coil 184 forming part of a carbon pointed relay. When the member 171 is flexed to close the local circuit the coil 184 will be energized to close the contacts 185 and thereby establish a circuit which includes a source of power 186 and three solenoids 187, 188 and 189 controlling respectively the operations of the main reciprocating carriage 28, the saw carriage or support 45 and the clamps for connecting the tube 25 and the carriage 28. It is apparent that as soon as the contact 171 is closed by the tube 25 the three solenoids just mentioned will all be energized. Solenoids 187 and 189 control valves 193 and 194 for admitting compressed air from a pressure line 195 to the cylinder 37 for operating the main reciprocating carriage 28 and a cylinder 196 containing the piston 82 which, as previously stated, operates the clamp member 72 to connect and disconnect the carriage and the tube, while the solenoid 188 renders effective a one-revolution clutch 197—198 (see also Fig. 4) for causing a rotation of the shaft 61 (Fig. 5) and the lateral to and fro movements of the saw support while the carriage is moving.

The mechanism of the valve 193 for the main carriage is shown in detail in Figs. 3, 7 and 20. It comprises a member 201 loose on the shaft 202 and provided with a segmental portion 205 cooperating with an adjustment worm 206 on a plate 207 attached to the shaft 202. A spring 208 tends at all times to swing the member 201 and shaft 202 clockwise in Fig. 20, but such movement is normally prevented by a latching arm 209 pivoted at 210 on a mounting plate 211. Rigid with the latching arm 209 is an arm 212 engaging a pin 213 moving with the core of the solenoid 187. A spring 214 holds the arms 209 and 212 in latching position.

When the solenoid 187 is energized, the latching arm 209 will be tripped, thereby allowing the member 201 and the shaft 202 to be turned by the spring 208 until further movement is arrested by a stop 215. The movement of the parts just described will open the valve 193 to admit air to the cylinder 37.

The valve 193 comprises an internal rotary member 216 (Fig. 7) rigid with the shaft 202 and having an opening 217 which is in alignment with an outlet 218 which connects with the air line 195 leading to a port 219 (Fig. 4) in the head of the cylinder 37 for operating the main reciprocating carriage. The rotary member 216 is also provided with an opening 221 which is brought into alignment with an air inlet opening 220 through the valve casing and which connects with the air line 195 when the latching arm 209, Fig. 20, is released by operation of the solenoid 187. This is the position in which the parts are shown in Fig. 7. The air passing through the passages 221 and 218 will drive the piston 36 forward with the progressing tubing for the required distance, about three feet in the present embodiment, after which the rotary member 216 in the valve will be turned to bring the opening 221 in alignment with an escape opening 223 through the valve shell. The weights 38 will then return the carriage toward its starting point and as the carriage approaches its original starting point the member 216 will be turned a little farther to bring the opening 221 in alignment with a bleeding valve or port 224, equipped with the usual screw for regulating the escape of the air. The bleeding valve 224 therefore acts to create an air cushion for the piston 36 within the cylinder 37 to prevent the carriage 28 from jar when it hits the stop 41 for the carriage.

The mechanism for effecting the movements of the rotary member 216 in the valve includes a member 225, Fig. 7, which is provided with cam rollers 226 and 227, cooperating respectively with a rotating cam 228 and stationary cam 229, the latter cam being fixed to one of the rails 30 supporting the main carriage 28 and the former splined or secured to the shaft 61 (Fig. 5) which, as before stated, is given a complete rotation at each operation of the severing mechanism.

The member 225 has a segmental portion 231 meshing with a pinion 232 splined upon the shaft 202. The shaft 202, as before stated, is rigid with the rotary member 216 in the valve 193. A bracket 234 attached to the carriage 28, contacts with the pinion 232 and causes the pinion to slide along the shaft 202 as the carriage 28 is reciprocated. The cam 228 is so shaped that as the shaft 61 completes its rotation the member 225 will be rocked from the position shown in Fig. 7 far enough for a shoulder 235, Fig. 20, on the latching arm 209 to engage the lower end of the member 201 and latch it and the connected mechanism in the position to which they are moved by the cam 228. In this position the opening 221 (Fig. 7) in the rotary valve member 216 will be in alignment with the escape opening or vent 223 to allow the air to leave the cylinder 37 and permit the weights 38 to draw the carriage toward its starting point. As the carriage approaches its starting point the roller 227 engages the upper side of the cam 229 causing the member 225 to be rocked still further in a counter-clockwise direction, Fig. 7, thereby turning the member 216 in the valve to bring the opening 221 in alignment with the bleeding port 224. This movement of the parts carries the arm 201 to the position in which it is shown in Fig. 20, in which position it is retained by a shoulder 236 near the end of the arm 209. The parts remain in this position until the next cycle of movement is started by closing the contact 171 as previously mentioned.

The mechanism for operating the clamp mechanism includes the solenoid 189 previously referred to and the valve 194 for controlling the admission of air pressure either above or below the piston 238 in the cylinder 196, Fig. 5, for operating the tube clamps. The valve 194 includes a rotary inner member 241, Fig. 10, provided with an air passage 242 so shaped that in either of two positions it is open to an air inlet 243 from the air line 195. In the figure last mentioned, the rotary member is shown in the position it occupies in the normal position of the parts, i. e., the position in which an air tube 244 leading to the portion of the cylinder above the piston 238, Fig. 5, is open to the air line, in which position the piston 238 will have been forced down to open the clamps for the tube 25. The rotary member 241 is retained in this position by a latching arm 246 forming a part of the bell crank connected at 247 to the core of the solenoid 189 and held in latching position by a spring 248. The latching arm 246 cooperates with a lever 251 rigid with the rotary member 241 and it is swung clockwise, Fig. 10, by a spring 252 when the latch 246 is released by the solenoid. This rotation of the member 241 will carry the air passage 242 into alignment with the tube 254 leading to the portion of the cylinder below the piston 238, Fig. 5, causing the piston to be thrust upward to straighten the toggles 79 and 80 and clamp the tube 25. In either position of the rotary member 241, the inactive side of the cylinder 196 is connected to one or the other of the air vents 255 or 256 to allow the air to escape from the cylinder as the air pressure is applied to the opposite side of the piston.

When the latch arm 246 is withdrawn and the rotary member 241 operated by the spring 252, the movement is limited by a collar 261 secured to a rod 262 pivoted to the upper end of the lever 251. The end of the rod 262 is provided with a head 263 which, at the end of the air driven stroke of the carriage 28 strikes an adjustable stop 264 carried by an arm 265 attached to one of the rails 30 so that the final movement of the carriage will act through the rod 262 to shift the rotary member 241 of the valve 194 to the clamp opening position in which it will be latched by the latching arm 246. As the valve 194, the solenoid 189 and the intermediate mechanism travel with the carriage 28, a flexible hose connection 266, Fig. 21, is used to connect the valve with the air pressure line 195.

The mechanism for effecting the rotations of the shaft 61 to operate the saw carriage 45 and the cam 228 for actuating the shaft 202 to permit the escape of the air from the cylinder 37, comprises a gear 271 (Figs. 4 and 5) splined upon the main power shaft 100 and meshing with a gear 272 loose upon the shaft 61.

Spacing collars or sleeves 274 and 275 at either side of the gear 271 cooperate with the arms 62 and 63 dependent from the carriage 28 to hold the gear 271 in alignment with the gear 272 during the sliding movements of the carriage. Rigid with the gear 272 is a driving member 197 of the one-revolution clutch previously mentioned. Adjacent the driving member 197 is the driven member 198 secured to the shaft 61 in any suitable way.

The driven member 198 is provided with a radially extending slot 278 in which is pivoted a pawl 281 which is impelled by a spring 282 to engage a nose 283 on the pawl with a cut 284 in the driving member 197 to connect the driving and driven members when it is desired to transmit movement of the power shaft 100 to the one revolution shaft 61.

Between operations of the shaft 61 the pawl 281 is held in the position shown in dotted outline in Fig. 8 by an arm 286 pivoted at 287, Fig. 9, and connected at 289 to the solenoid 188. A spring 290 normally holds the arm 286 in position for a shoulder 291 thereon to rest in the path of a pin 292 extending from the pawl. When the solenoid 188 is energized the arm 286 will be moved upward to disengage the shoulder 291 from the pin 292 thereby allowing the spring 282 to operate the pawl 281 to establish a connection between the clutch members 197 and 198. Near the end of the rotation of the clutch members, and, consequently the shaft 61, a curved extension 294 of the arm 286 will be engaged by the pin 292 and the pawl swung far enough to withdraw its nose 283 from engagement with the driving clutch element 197 and the shoulder 291 will then arrest the driven member 198 and the mechanism connected thereto.

The pawl 281 for connecting and disconnecting the two members of the clutch 197—198 is the same in construction and operation as the pawl 136 (Figs. 12 and 17) for connecting and disconnecting the members 108 and 112 of the clutch for operating the side delivery mechanism. It will be recalled that in describing the latter clutch it was stated that the pawl mechanism and its operation would be described in connection with a clutch forming part of another section of the mechanism, the second clutch in mind being the clutch 197—198 which has now been described in full detail.

In describing the construction of the illustrative embodiment of the invention it has been necessary incidentally to describe the oprations of the various parts and of the mechanism as a whole in such detail that it is thought that a summary of the operation is unnecessary to this point.

While the embodiment of the invention which has been shown and described is admirably adapted to accomplish the purposes primarily stated, it is not the desire to be limited to that embodiment, as the invention is capable of various modifications and changes all coming within the scope of the claims which follow.

What is claimed is:

1. An apparatus for cutting off sections from a continuously fed tube, comprising the combination of devices for severing the tube, an electrical contact cooperating with the tube and adjustable to various positions along the line of travel of the tube to regulate the length of the cut off, devices comprising a one-revolution clutch controlled by the contact for operating the severing devices, and means for speeding the severed section of tubing out of the way of the tubing which is being fed past severing devices.

2. An apparatus for cutting into sections tubing coming from a continuous tube welding machine, comprising the combination of a reciprocatory carriage, devices operable to connect the tube to the carriage during movement of the carriage in one direction and disconnect the tube and carriage before the movement of the carriage in the opposite direction begins, a severing device supported by the carriage, means for operating the severing device to sever the tube while the tube is connected to the carriage, mechanism for reciprocating the carriage at a speed tending to draw the tube away from the welding machine while the tube is connected to the carriage, and meachanism controlled by the tube for operating the aforesaid connecting and disconnecting devices and the carriage in the specified timed relation.

3. An apparatus for cutting into sections tubing coming from a continuous tube welding machine, comprising the combination of a reciprocatory carriage, devices operable under control of the tube to connect the tube and the carriage during movement of the carriage away from the welding machine and to disconnect the tube and carriage before the movement of the carriage in the opposite direction begins, mechanism for driving the carriage while the tube is connected to the carriage at a speed sufficient to relieve the tube from any retarding influence due to the connected carriage and comprising means for retarding the return movement of the carriage, a tube severing device supported by the carriage, mechanism for operating the aforesaid connecting and disconnecting devices in the specified timed relation with the movements of the carriage, devices for applying the severing device to the tube while the tube is connected to the carriage, and devices for speeding the severed section of the tube out of the way of the advancing tube.

4. An apparatus for cutting into sections tubing coming from a continuous tube welding machine, comprising a reciprocatory carriage, clamps for connecting the carriage to the tube during movement of the carriage in one direction and operable to release the connection before the return movement of the carriage begins, severing devices for the tube operable while the clamp connection is effective, said clamps and said severing devices being mounted on the carriage, means for actuating the carriage when the clamps become effective and tending to draw the tube ahead in the direction in which the tube is moving while the severing devices are operated, devices controlled by the actuating devices operating to restore the carriage to its starting point after the clamps are released, and means controlled by the tube for operating the clamps and severing devices.

5. An apparatus for cutting into sections tubing coming from a tube welding machine comprising in combination, clamps operable to grasp the tubing, a saw operable to sever the tubing, a carriage mounted for reciprocatory movement along a line parallel to the direction of movement of the tubing and supporting the saw and the clamps, devices for reciprocating the carriage and operating the clamps and saw to grasp and sever the tubing while said carriage is moving in one direction and then release the clamps and withdraw the saw before the carriage starts its movement in the other direction, and means comprising an electrical contact closed by the tubing for controlling the operations of said devices.

6. In an apparatus of the character described, a saw for cutting off sections from a tubing which is moved endwise, clamps operable to grasp the tubing, supports for the clamps operable to give a reciprocatory bodily movement to the clamps along a line parallel to the direction of movement of the tubing, devices for operating the clamps to grasp the tubing, moving the clamps in the direction of movement of the tubing, releasing the clamps and then restoring them to their original position, means for operating the saw to cut off the tubing while the clamps are grasping the tubing, and means comprising an electrical contact closed by engagement therewith of the section of tubing which is to be cut off for controlling the aforesaid devices.

7. An apparatus for severing sections of different lengths from a tube coming from a continuous tube welding machine comprising the combination of a reciprocatory carriage, a rotary severing device mounted on the carriage, mechanism for applying the severing device to the tube constructed to vary the rate of application according to the part of the cross-section of the tube upon which the device is acting, devices operable to connect the carriage to the tube while the severing device is being applied, and mechanism for reciprocating the carriage and operating the severing mechanism and connecting devices.

8. An apparatus for severing sections of different lengths from a tube coming from a continuous tube welding machine comprising the combination of a first reciprocatory carriage and mechanism for reciprocating it along a line parallel to the tube, a second carriage mounted on the first carriage for reciprocatory movement at right angles to the movement of said first carriage, a continuously running saw mounted on the second carriage, devices comprising a lever and crank for effecting the movements of the second carriage to carry the saw through the tube at a gradually increasing and then decreasing rate, devices operable to connect the first carriage to the tube before the second carriage starts to move, and means for applying a reciprocatory force to the first carriage after the connection is effected.

9. In an apparatus of the character described, the combination of a severing device for cutting off sections from a continuously fed tube, an electrical contact controlled by the tube and in turn controlling operations of the severing device, a support for said contact adjustable along the line of travel of the tube to vary the time of operation of the severing device with reference to the rate of feed of the tube and thereby vary the length of the cut off, and devices controlled by said contact for moving the contact out of the path of the tube between operations of the severing mechanism.

10. In a machine of the class described the combination of a mechanism operable to sever sections of different desired lengths from a continuously fed tube, a receiver for such sections, a mechanism for making deliveries to the receiver, means comprising an adjustable device cooperating with the tube for regulating the time of operation of the severing mechanism and delivery mechanism with reference to the rate of feed of the tube to vary the lengths of the sections severed and delivered, and means controlled by the adjustable device for moving said device in and out of cooperating relation with the tube in a timed relation with the operations of the severing and delivering mechanism.

11. In a machine of the class described, a mechanism operable to sever sections of different lengths from a continuously fed tube comprising an adjustable device for determining the length of the section to be severed by the severing mechanism, said device comprising a member normally in the path of the tube. a delivery mechanism for carrying severed sections out of the path of oncoming sections, and devices for automatically withdrawing said member from the path of the tube before operation of the delivery mechanism and returning same to said path after such operation.

12. In a machine of the class described, the combination with mechanism for severing sections from a continuously advancing tube, of a delivery mechanism for carrying the severed sections of the laterally out of the path of the advancing tube, devices intermediate the severing and delivery mechanisms for transferring sections from the severing to the delivery mechanism, apparatus for controlling the operations of the severing and delivery mechanisms to vary the length of the sections cut off and delivered comprising a member normally in the path of the advancing section, and devices for automatically withdrawing said member from the path of the tube prior to operation of the delivery mechanism.

13. In an apparatus of the character described, a receiving rack removed from and parallel to the line of travel of a continuously advanced tubing, a support adjustable to various positions along the line of travel of the tubing, an electrical contact mounted on said support and closed by the advancing tubing, devices controlled by said contact for severing and delivering to the receiving rack lengths of tubing varying according to the position of the aforesaid adjustable support, and means controlled by the contact for moving the contact into and out of the path of the tube between deliveries to the receiving rack.

14. In a machine of the class described, the combination with mechanism for severing desired lengths from a continuously fed tube, of devices for speeding the severed lengths ahead of the movement of the continuously fed tube, troughs into which the severed lengths are delivered by said devices, arms rotatable at right angles to the troughs and constructed to lift said lengths out of the troughs, mechanism for operating said arms in timed relation with the delivery of severed lengths of the tube to the trough by the aforesaid devices, and means for simultaneously varying the time between operations of the severing mechanism and said arms.

15. In a machine of the class described, the combination with mechanism for severing sections or lengths of tube from a continuously fed tube, of devices comprising a pair of rolls operable to speed severed sections of the tube ahead of and out of the way of the continuously fed tube, a receiver to which the severed lengths are delivered by said rolls, arms rotatable at right angles to the length of the receiver to lift the severed sections out of said receiver, mechanism for rotating said arms in timed relation with the delivery of severed sections to the receiver by the aforesaid rolls, and means comprising a control apparatus for varying the time between operations of said arms and the severing mechanism.

16. In a machine of the class described. the combination with mechanism for severing desired lengths from a continuously fed tube, of delivery devices for speeding the severed lengths ahead of and then carrying them laterally out of the path of the continuously fed tube, and electric control apparatus comprising an adjustable member for regulating the length of the sections or lengths to be severed from the continuously fed tube by the severing mechanism and delivered by the aforesaid devices.

17. In a machine of the class described. the combination with devices operable to sever desired lengths from a continuously fed tube, mechanism for speeding the severed lengths ahead of the continuously fed tube, a side delivery mechanism for moving the severed lengths laterally out of the path of the following length, mechanism for operating the severing devices and side delivery mechanism in a fixed sequence, and a control apparatus for varying the time between sequences according to the length of tube to be severed and delivered.

18. An apparatus for cutting into sections tubing coming from a continuous tube welding machine, comprising a carriage supported for reciprocatory movement parallel to the line of travel of the tube, devices for effecting the reciprocatory movements comprising a piston, devices operable to connect the tube and carriage during movement of the carriage in the direction in which the tube is advanced and disconnect the tube and carriage before the opposite movement of the carriage begins, a valve controlling operations of the piston, and devices controlled by the tubing for operating said valve and the devices for connecting and disconnecting the tube and the carriage.

19. An apparatus for cutting into sections tubing coming from a continuous tube welding machine, comprising a carriage supported for reciprocatory movement parallel to the line of travel of the tube, devices for effecting said reciprocatory movements comprising a piston, devices operable to connect the tube and carriage during movement of the carriage in the direction in which the tube is advanced and disconnect the tube and carriage before the return movement of the carriage begins, a valve controlling operations of the piston, a side delivery mechanism, a support adjustable to various positions along the line of travel of the tube, a member carried by said support projecting into the path of the tube, and means requiring engagement of the tube with said member for operating the piston valve, the side delivery mechanism and the devices for connecting and disconnecting the tube and carriage.

20. An apparatus for cutting into sections tubing coming from a continuous tube welding machine, comprising a carriage supported for reciprocatory movement parallel to the line of travel of the tube, devices for effecting the reciprocatory movements comprising a piston cooperating with the carriage, connecting devices operable to connect the tube and carriage during movement of the carriage in the direction in which the tube is advanced and disconnect the tube and carriage before the return movement of the carriage begins, a valve mechanism controlling the operations of the piston comprising inlet, outlet and bleeding ports, devices controlled by the sections of tubing for operating the valve to render said ports successively effective, and means also controlled by the devices last mentioned for operating the aforesaid connecting devices.

21. An apparatus for cutting sections from the end of a tube coming from a continuous tube welding machine comprising in combination a reciprocatory carriage, a severing device and clamps for the tube supported by said carriage, mechanism comprising a one-revolution clutch for operating the severing device and a piston for operating the clamps, devices comprising a piston for effecting reciprocations of the carriage, a device adjustable to different positions along the line of travel of the tube, a member carried by said device in the path of the sections of the tube, and means controlled by said member for controlling the operations of the pistons and the aforesaid clutch.

22. A cut-off and delivery mechanism for tubing fed at a uniform rate, comprising a severing device, a carriage for the severing device, clamps for connecting and disconnecting the carriage and the tubing, a piston for driving the carriage and means for operating it, side delivery mechanism for the severed sections of tubing, mechanism comprising a clutch controlled by the carriage for operating the delivery mechanism, and means requiring movement of the carriage to release the tube clamps.

23. In an apparatus of the character described, a reciprocatory carriage and means for reciprocating it parallel to the line of travel of a continuously fed tube, clamps operable to connect and disconnect the carriage and tube, devices controlled by the tube for operating the clamps to connect the carriage and tube while the carriage is moving in the direction of the feed and disconnect the carriage and tube before the opposite movement of the carriage begins, devices for severing the tube while the clamps are in connecting condition, and devices for projecting the severed sections ahead of the oncoming tubing when the clamps are released.

24. In an apparatus for severing sections from a tubing moving in an endwise direction, a reciprocatory carriage and mechanism for reciprocating it along a line parallel to the line of travel of the tubing, a severing mechanism supported by the carriage and means for effecting severing operations of it, clamps operable to connect the carriage and tube while the carriage is moving in the direction of the tube feed and to disconnect the carriage and tube while the carriage is returned, devices requiring the feed of a predetermined length of tubing for operating the carriage reciprocating mechanism, the severing mechanism and the clamps, and apparatus comprising a manually adjustable device for determining the length of tube required for the purpose stated.

25. In an apparatus for automatically cutting into sections tubing coming from a continuous tube welding machine, the combination with a carriage and means for giving it a reciprocatory movement along the line of travel of the tubing, severing mechanism mounted on said carriage and mechanism for operating it while the carriage is moving in one direction, clamps for connecting the carriage and the tubing while the carriage is moving in the direction of the tube feed, a variable control apparatus for initiating operations of the carriage, severing mechanism and the clamps, and devices requiring a full stroke of the carriage in one direction for releasing the clamps.

26. In an apparatus for severing a moving tube into sections, a carriage and mechanism for reciprocating it, a saw carriage supported for lateral movement on the first carriage, clamps supported by the first carriage and operable to connect the tube and said first carriage during movement of said first carriage in one direction and to disconnect the tube and said first carriage during the movement of the latter in the opposite direction, devices carried by the first carriage for giving a reciprocating movement to the saw carriage, a side delivery mechanism comprising a set of lifting arms and a storage rack, an electric relay mechanism comprising a contact momentarily closed by the moving tube, a power circuit controlled by the relay, and devices in the power circuit for controlling operations of the clamps, the first carriage, the saw carriage and the side delivery mechanism in a fixed sequence.

27. An apparatus for cutting off sections from a continuously fed tube, comprising the combination of devices for severing the tube, an electrical contact cooperating with the tube and adjustable to various positions in the line of travel of the tube to regulate the length of the cut off, and devices comprising a clutch controlled by the contact for operating the severing devices when the contact is closed by the end of the advancing tube.

In testimony whereof I hereto affix my signature.

BJORNULF JOHNSEN.